United States Patent [19]

Klein

[11] Patent Number: 4,616,910
[45] Date of Patent: Oct. 14, 1986

[54] VISUAL INDICATOR ON SOFT CONTACT LENSES

[76] Inventor: Robert E. Klein, 7350 Willow Brook La., Cincinnati, Ohio 45237

[21] Appl. No.: 581,098

[22] Filed: Feb. 24, 1984

Related U.S. Application Data

[63] Continuation-in-part of Ser. No. 471,187, Mar. 1, 1983, abandoned.

[51] Int. Cl.⁴ .............................................. G02C 7/04
[52] U.S. Cl. ................................ 351/162; 351/160 H
[58] Field of Search ............... 351/160 H, 160 R, 161, 351/162

[56] References Cited

U.S. PATENT DOCUMENTS 4,193,671 3/1980 Erickson et al. ............... 351/162 X
4,525,044 6/1985 Bauman .......................... 351/162 X Primary Examiner—John K. Corbin
Assistant Examiner—Scott J. Sugarman
Attorney, Agent, or Firm—Frost & Jacobs

[57] ABSTRACT

A soft contact lens is provided with a visual indicator to show that it is not inside out prior to application to the eye. The indicator is such that when viewed from the outside surface of the soft contact lens, it has a distinctly different appearance than when viewed from the inner surface of the lens.

17 Claims, 15 Drawing Figures

VISUAL INDICATOR ON SOFT CONTACT LENSES

REFERENCE TO RELATED APPLICATION

The present application is a continuation-in-part application of co-pending application Ser. No. 06/471,187, filed Mar. 1, 1983, now abandoned, in the name of Robert E. Klein, and entitled "A VISUAL INDICATOR ON SOFT CONTACT LENSES".

TECHNICAL FIELD

The invention relates to visual indicator on soft contact lenses, and more particularly to such an indicator which will show at a glance whether a soft contact lens is inside out or right side out.

BACKGROUND ART

Soft contact lenses, as their name implies, are made of soft, pliable material of such nature that they can readily be inadvertently turned inside out. While some soft contact lenses, when turned inside out, form an easily discernible peripheral rim or flange, this is not true of many. As a result, in many instances it is extremely difficult to determine whether a soft contact lens is inside out or right side out. This is particularly true, for example, of some low power soft contact lens.

It is, of course, important that soft contact lenses be placed on the eyes correctly. If a soft contact lens should inadvertently be turned inside out, this can distort the optical properties of the lens. An inside out lens can cause discomfort to the eye and in some instances can result in eye damage.

It is known in the art to provide one lens of a pair of hard contact lenses with a dot or some other appropriate form of indicia, near its peripheral edge, to distinguish a contact lens for the right eye from a contact lens for the left eye. It is also known to provide by drilling or other appropriate means dots, lines or the like on a contact lens to locate the lens axis when dealing with astigmatic lenses.

Prior art workers have devised numerous methods of marking transparent material such as lenses. For example, U.S. Pat. No. 3,657,085 discloses a method of marking transparent objects such as lenses or the like by producing localized permanent stresses in the transparent material which become visual through double refraction in polarized light. U.S Pat. No. 3,880,631 teaches the provision of a Prussian blue edge marking on ophthalmic lenses to be subject to chemical tempering. After the tempering step, the yellow color of the edge marking clearly indicates that the lens has been subjected to the chemical tempering step.

U.S. Pat. No. 4,039,827 sets forth a method of marking intraocular plastic lenses for coding purposes. According to the teachings of this reference, the lens is subjected to ultraviolet radiation through a mask providing the coding characters. This produces a differential in refractive index of the material of the lens. The coding characters can be read with the aid of ordinary ophthalmological instruments. U.S. Pat. No. 4,194,814 teaches the application of identifying symbols on contact lenses utilizing a laser beam and an appropriate mask. The laser beam results in sublimation of lens material and the depth to which this occurs can be determined through wave length and energy level selection. Finally, U.S. Pat. No. 4,257,692 teaches a method of indelibly marking ophthalmic lenses of organic material. Optical brighteners are used, being applied by thermal transfer. The optical brighteners are absorbed in vapor form into the material of the lens and are anchored therein after returning to the solid state. The indicia produced by this method is visible to the naked eye only in ultraviolet light.

It will be evident from the above that the various types of markings or indicia achieved by the prior art are for a different purpose and would not be suitable in readily determining whether a soft contact lens is inside out or right side out.

The present invention is based upon the discovery that a soft contact lens may be provided with an indicator, viewable by the naked eye, which has a distinctly different appearance when viewed from the inside surface of the soft contact lens than it does when viewed from the outside surface of the contact lens. This can be accomplished in a number of ways, exemplary embodiments of which will be described hereinafter.

DISCLOSURE OF THE INVENTION

According to the invention there is provided a visual indicator on a soft contact lens to show quickly and clearly that the soft contact lens is not inside out, prior to application of the lens to the eye. The indicator is such that when viewed from the outside surface of the soft contact lens it will have a distinctly different appearance than when viewed from the inside surface of the lens. This is accomplished, for example, by providing an indicator which is made up of two superposed parts, each of which, when viewed from its respective side, in part at least masks the other to achieved the above noted distinct appearance difference.

In one embodiment of the present invention, the contact lens is provided with a tapered bore extending from the outside surface of the lens toward the inside surface of the lens. The bottommost portion of the bore is filled with a colored material and the upper portion or remainder of the bore is filled with a colored material of a different color. As a result, when the indicator is viewed from the inside surface of the lens, the colored material in the bottom portion of the bore will be visible, surrounded by the colored material in the remainder or upper portion of the bore. On the other hand, when the indicator is viewed from the exterior surface of the lens, only the colored material in the upper portion of the bore will be visible. Thus, when the user locates the lens upon his finger and views what he believes to be the exterior surface of the lens, prior to placement of the lens on the eye, should he see only the color in the upper portion of the bore, he can then be assured that the lens is properly right side out. Should he see, however, the color in the lowermost portion of the bore, surrounded by the color in the upper portion of the bore, then he will readily realize that what he believed to be the exterior surface of the lens is indeed the interior surface of the lens and the lens is inside out.

A second embodiment of the indicator of the present invention is similar to the first, differing only in that the bore is of constant cross section throughout its length. As a result, when the indicator is viewed from the inside surface of the lens, only the color of the material in the lowermost portion of the bore will be visible. When the indicator is observed from the exterior surface of the lens only the color of the material in the upper portion of the bore will be visible.

In a third embodiment, the indicator is so arranged that, when viewed from the inside surface of the lens, it will display a pattern on an opaque background. When viewed from the exterior surface of the lens, it will display the opaque background only.

In a fourth embodiment of the present invention, a dye of one color is located on the exterior surface of the lens and a dye of another color is located on the interior surface of the lens. The dye on each lens surface may be applied as a small dot near the lens periphery, or the dye on each surface may cover a preponderance of the area of its respective lens surface. In either event, the exterior and interior surface areas treated with the dyes should be superposed with respect to each other, with the lens material therebetween, so that the color appearance of the indicator is distinctly different when viewed from the true exterior of the lens and when viewed from the true interior of the lens.

DETAILED DESCRIPTION OF THE INVENTION

Figure 1:
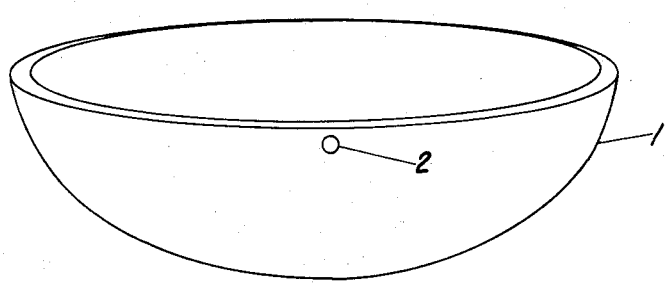
FIG. 1 is a perspective view of a conventional soft contact lens provided with an indicator of the present invention.

A first embodiment of the indicator of the present invention is illustrated in FIGS. 1 through 4, wherein like parts have been given like index numerals. In FIG. 1 a conventional soft contact lens is shown at 1. As is well known in the art, the soft contact lens 1 is of a shallow dish-shaped configuration and is made of soft, pliable, transparent plastic material. The indicator of the present invention is shown at 2. Preferably, the indicator is located near the periphery of the soft contact lens 1.

Figure 2:
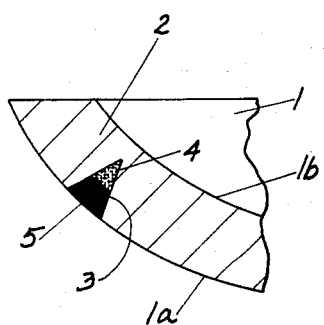
FIG. 2 is a fragmentary cross sectional view through the indicator of FIG. 1.

Reference is now made to FIG. 2 which is a fragmentary cross sectional view taken through the indicator 2. The indicator 2 comprises a bore or perforation 3 formed in the lens 1 and extending from the exterior surface 1a of the lens toward the inner surface 1b of the lens. While not required, it is preferred that the bore 3 does not extend through the inner surface 1b of the lens, the inner surface thus remaining smooth and uninterrupted. As is clear from FIG. 2, the bore 3 is tapered downwardly and inwardly into the lens. While the bore 3 may have any appropriate cross sectional configuration, for purposes of an exemplary illustration it is shown as being a simple conical bore.

The deepest or lowermost portion of bore 3 is filled with a first colored material 4. The upper or remaining portion of bore 3 is filled with a second colored material 5. As used herein and in the claims, the term "colored material" should be interpreted broadly enough to encompass colored solid inserts, pigments, dyes, and the like.

The colored materials 4 and 5 must be selected to be safe for use in the environment of the eye. The actual colors used may vary, so long as the colors of materials 4 and 5 are distinctively different with respect to each other. While not intended to be so limited, it is preferred that the colored material 4 is a light, bright color, such as red, orange or the like. Yellow, for example, has particular utility in that it will be readily perceived by someone afflicted with color blindness. The colored material 5 is preferably of a darker, contrasting color and might even advantageously be black.

Figure 3:
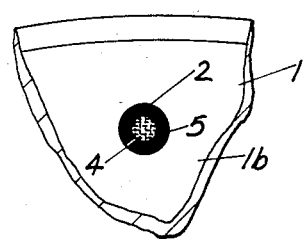
FIG. 3 is a fragmentary view of the interior surface of the soft contact lens of FIG. 1, illustrating the indicator as seen from the inner surface.
Figure 4:
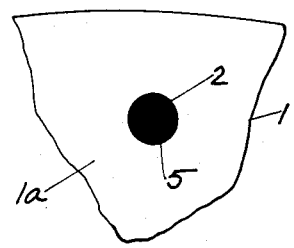
FIG. 4 is a fragmentary view of the exterior surface of the soft contact lens of FIG. 1, illustrating the indicator as seen from the exterior lens surface.

While not intended to be a limitation upon the present invention, for purposes of describing FIGS. 3 and 4, the colored material 4 will be assumed to be yellow and the colored material 5 will be assumed to be black. FIG. 3 illustrates the indicator 2 as it would appear when viewed from the true inner surface of soft contact lens 1. Since colored material 4 is foremost, its bright yellow color will be apparent to the viewer, surrounded by a thin band of black, constituting that portion of colored material 5 which is not masked by colored material 4. When the indicator 2 is viewed from the true exterior surface of lens 1, as shown in FIG. 4, the indicator will appear as a black dot since black material 5 will totally mask yellow material 4. Thus, when the user examines the lens 1 just before application to the eye, if what appears to be the exterior surface of the lens shows the indicator in the form of a black dot, the user may be assured that the lens is right side out. If, on the other hand, the lens is viewed from what appears to be its exterior surface and the indicator shows up as a yellow dot surrounded by a thin black border, then the user can be assured that the lens has inadvertently been turned inside out and can correct this circumstance prior to application of the lens to the eye.

Figure 5:
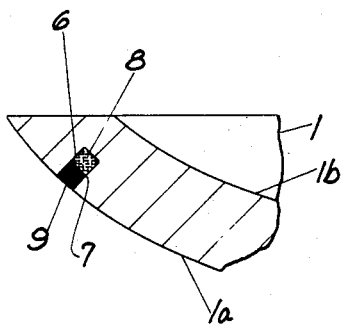
FIG. 5 is a fragmentary cross sectional view similar to FIG. 2 and illustrates a second embodiment of indicator.
Figure 6:
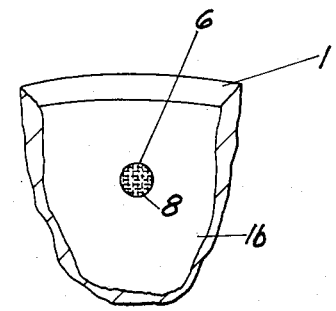
FIG. 6 is a fragmentary view illustrating the indicator as seen from the inner surface of the soft contact lens.
Figure 7:
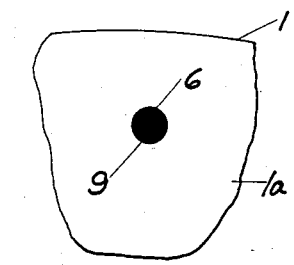
FIG. 7 is a fragmentary view similar to FIG. 4 and illustrating the indicator of FIG. 5 as seen from the exterior surface of the soft contact lens.

A second embodiment of the indicator of the present invention is illustrated in FIGS. 5, 6 and 7. These Figures illustrate fragments of the same lens 1, and like parts have again been given like index numerals. In FIGS. 5, 6 and 7, the indicator is designated by index numeral 6. The indicator differs from indicator 2 of FIGS. 1-4 only in that it is formed as a cylindrical bore 7 extending from the exterior surface 1a of lens 1 toward the interior surface 1b of the lens. The bottom portion of bore 7 (i.e. the portion nearest the interior surface 1b of the lens) is filled with a first colored material 8. The upper portion of bore 7 (i.e. the remainder of the bore) is filled with a second colored material 9. The nature of the colored materials 8 and 9 can be the same as that described with respect to FIGS. 1-4. Again, while not intended to be so limited, it will be assumed for purposes of description that material 8 is yellow and material 9 is black.

The operation or use of indicator 6 is substantially identical to that of indicator 2. In this instance, however, when the indicator is viewed from the true inner surface 1b of lens 1, the indicator will appear as a yellow dot, the colored material 8 substantially totally masking colored material 9. This is shown in FIG. 6. When the indicator 6 is viewed from the true exterior surface 1a of lens 1, it will appear as a black dot, the material 9 masking the material 8. Again, if the user inspects the lens prior to application to the eye, and what appears to be the exterior surface of the lens shows a yellow dot, he can be assured that the lens is inside out. If the indicator appears as a black dot, the user can be assured that the lens is right side out and in correct condition for application to the eye.

Figure 8:
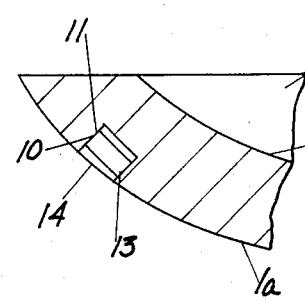
FIG. 8 is a fragmentary cross sectional view, similar to FIGS. 5 and 2, and illustrates yet another embodiment of the indicator of the present invention.
Figure 9:
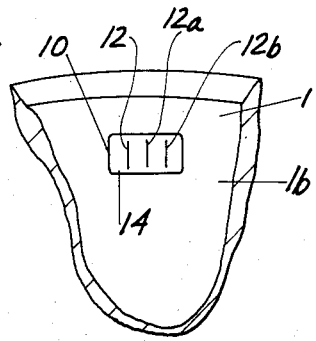
FIG. 9 is a fragmentary view illustrating the indicator of FIG. 8 as seen from the inner surface of the soft contact lens.
Figure 10:
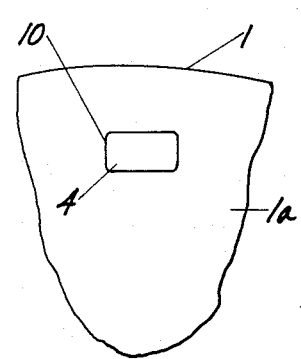
FIG. 10 is a fragmentary view illustrating the indicator of FIG. 8 as seen from the exterior surface of the soft contact lens.

A third embodiment of the invention is illustrated in FIGS. 8, 9 and 10. These Figures are similar to FIGS. 2-4 and FIGS. 5-7 and again are fragmentary showings of the lens 1 having the true exterior surface 1a and the true inner surface 1b. In this instance, the indicator 10 comprises a depression 11. The depression 11 extends from the exterior surface 1a of lens 1 toward (but not necessarily through) the inner surface 1b thereof. Located at the bottom of depression 11 (i.e. that portion nearest inner lens surface 1b) there is some form of pattern-creating device. For purposes of an exemplary showing, FIGS. 8 and 9 illustrate three segments of filament-like material 12, 12a and 12b. The filament segments 12-12b should be of such nature as to be readily visible and may be colored. The filament material should also be of such nature as to be safe for use in the environment of the eye. The filaments 12-12b are covered by an appropriate matrix material 13. The material 13 may even constitute the same material from which the lens 1 is made. The exterior surface of the matrix material 13, adjacent the exterior surface 1a of lens 1, may be colored as with an appropriate dye or it may be given a frosted surface or the like. This is indicated at 14. The colored or frosted surface 14 should be opaque so that the filaments 11-11b are not visible therethrough.

As a result of the above noted construction, when the indicator 10 is viewed from the true inner surface of the lens, the filaments 12-12b will appear as a pattern against the frosted or colored background 14. When the indicator 10 is viewed from the true exterior of lens 1, only the colored or frosted portion or background 4 of the indicator will be visible. It will be apparent to one skilled in the art that the dual appearance indicator 10 can be employed by the user of the lens in precisely the same manner as described with respect to the embodiments of FIGS. 1-7 to determine whether or not the lens is inside out or right side out.

The pattern visible from the true inner surface of lens 1 can be achieved in other ways. For example, a pattern could be etched, imprinted through the use of dyes, or otherwise appropriately applied to the bottom surface of depression 11. A pattern could also be appropriately applied to the inner surface 1b of lens 1, so long as it does not interrupt the surface 1b to the extent that it would be harmful to the eye.

Figure 11:
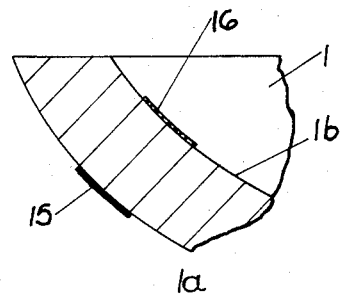
FIG. 11 is a fragmentary cross sectional view, similar to FIGS. 8, 5 and 2, and illustrates another embodiment of the indicator of the present invention.
Figures 12, 13:
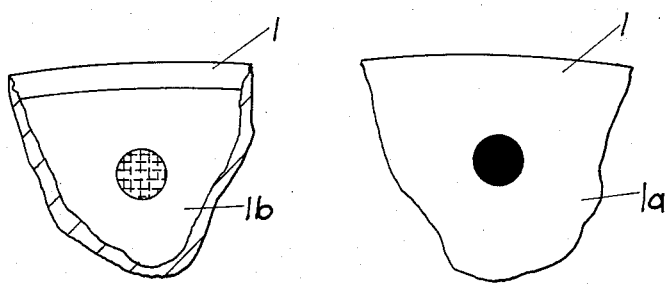
FIG. 12 is a fragmentary view illustrating the indicator of FIG. 11 as seen from the inner surface of the soft contact lens.
FIG. 13 is a fragmentary view illustrating the indicator of FIG. 11 as seen from the outer surface of the soft contact lens.

A fourth embodiment of the present invention is illustrated in FIGS. 11, 12 and 13. These Figures illustrate fragments of the same lens 1, and like parts have again been given like index numerals.

Dyes have been developed which have been proven safe for use on contact lenses and safe for use in the environment of the human eye. In the embodiment of FIG. 11, a small area of the exterior surface 1a of lens 1 is coated with a dye 15. In similar fashion, a small area of the inside surface 1b of lens 1 is coated with a dye 16. In FIG. 11, it will be understood by one skilled in the art that the dye coatings 15 and 16 are greatly exaggerated in thickness for purposes of clarity.

It is important to note that the areas of the exterior surface 1a and the interior surface 1b of lens 1, coated with dyes 15 and 16, are superposed with the material of the lens therebetween. While the areas of the dyes 15 and 16 are shown in FIGS. 11-13 as constituting small circular areas, the peripheral configurations of these areas is not so limited, so long as the areas are superposed. Again, the dyes 15 and 16 should be so chosen as to be sufficiently distinctively different with respect to each other that when the lens user views the indicator from the inside surface 1b of lens 1, as shown in FIG. 12, a color or a preponderance of color is easily seen which is visually distinct from that seen when the indicator is viewed from the exterior surface 1a of the lens 1, as shown in FIG. 13. Preferably, the dyes 15 and 16 are opaque. Nevertheless, this is not an absolute requirement so long as the appearance of the superposed areas is distinctly different when viewed from the exterior surface 1a and the interior surface 1b of lens 1.

Figures 14, 15:
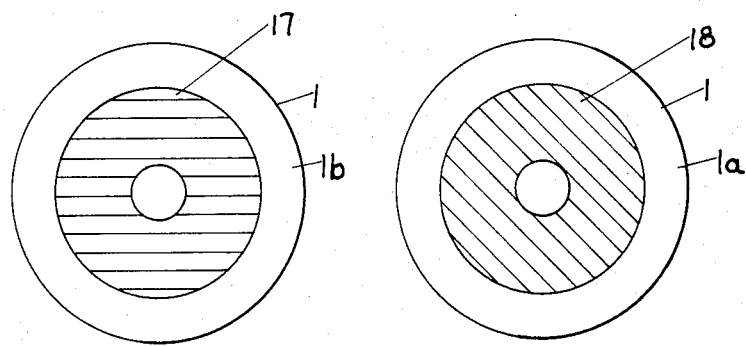
FIGS. 14 and 15 are, respectively, elevational views of the inner surface of a contact lens and the outer surface of a contact lens, wherein large superposed areas of the inner and outer surfaces have been coated with dyes of contrasting appearance.

Prior art workers have applied a dye to a large area of a contact lens to change the color of the iris of the wearer. The teachings of the embodiment of FIGS. 11-13 can be applied in such an instance. Reference is made to FIGS. 14 and 15. In FIG. 14, the inside surface 1b of lens 1 is shown provided with a large annular area 17 coated with a dye. In FIG. 15, the exterior surface 1a of lens 1 has a similar sized, superposed, annular area 18 coated with a dye of a different color. When the contact lens 1 is properly placed in the eye, the color of the dye of area 18 will be the color seen by an observer of the lens wearer's eye. Should the color of the area 18 appear to be on the inside surface of the lens prior to insertion of the contact lens by the wearer, the wearer can then be assured that the lens is inside out and can immediately correct this problem so that the true inside surface of the lens displays the color of the dye of area 17.

In all of the embodiments above described, an indicator is provided which, when viewed from the true inner surface 1b of lens 1, has one appearance and, when viewed from the true exterior surface 1a of lens 1, has a distinctly different appearance. In order to achieve the purpose of the present invention, the indicator must comprise superposed parts of such nature as to be readily visible without the use of special light or ophthalmological instruments.

Modifications may be made in the invention without departing from the spirit of it.

What is claimed is:

1. A visual indicator on an optical lens, said indicator having an appearance, when viewed from the exterior surface of said lens, which is distinctly different from its appearance when viewed from the inner surface of said lens, said indicator comprising two superposed parts, each of which, when viewed from its respective side of said lens, in part at least masks the other to achieve said distinct appearance difference, whereby said indicator will visually distinguish one side of said lens from the other.

2. The indicator claimed in claim 1 wherein said optical lens comprises a soft contact lens, said indicator visually showing when said soft contact lens is right side out.

3. The indicator claimed in claim 1 wherein said first and second parts differ in color.

4. The indicator claimed in claim 1 wherein said first part comprises a pattern and said second part comprises an opaque background.

5. The indicator claimed in claim 2 wherein said indicator comprises a bore extending from the exterior surface of said lens toward the inner surface of said lens, a first colored material located in the lowermost portion of said bore nearest said inner surface of said lens, a second colored material located in the upper portion of said bore nearest said exterior surface of said lens, said first and second colored materials being visually contrasting with respect to each other.

6. The indicator claimed in claim 2 wherein said indicator comprises a depression in said lens extending from said exterior surface thereof toward said inner surface thereof, means at the bottom of said depression forming a pattern, the remainder of said depression being filled with an appropriate matrix, means on the exterior surface of said matrix adjacent said exterior surface of said lens rendering said matrix exterior surface opaque.

7. The indicator claimed in claim 2 wherein said indicator comprises an area of the exterior surface of said lens coated with a first colored material and an area of the inner surface of said lens coated with a second colored material, said coated areas being superposed with respect to each other and said first and second colored materials being visually contrasting with respect to each other.

8. The indicator claimed in claim 5 wherein said bore is tapered downwardly and inwardly toward said lens inner surface.

9. The indicator claimed in claim 5 wherein said bore is cylindrical.

10. The structure claimed in claim 5 wherein said first colored material is of a bright color, said second colored material being darker than said first colored material.

11. The indicator claimed in claim 6 wherein said pattern forming means comprises a series of filaments.

12. The indicator claimed in claim 6 wherein said opaque surface is frosted.

13. The indicator claimed in claim 6 wherein said opaque surface is coated with a colored material.

14. The indicator claimed in claim 7 wherein said colored materials are dyes.

15. The indicator claimed in claim 7 wherein said areas are small areas adjacent the periphery of the lens.

16. The indicator claimed in claim 7 wherein said areas are large annular areas covering the majority of said lens.

17. The indicator claimed in claim 14 wherein said dyes are opaque.

* * * * *